United States Patent Office 3,415,069
Patented Dec. 10, 1968

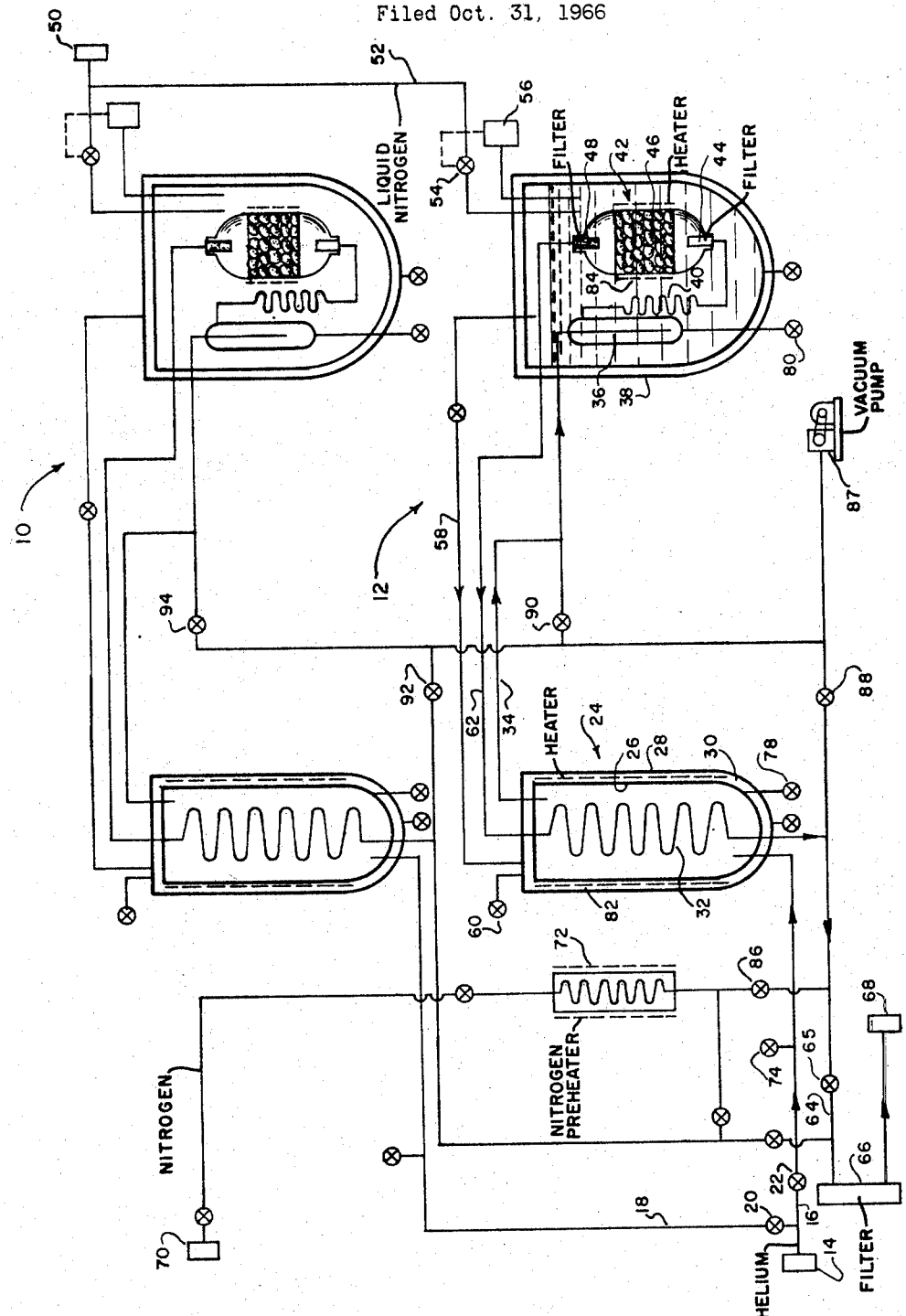

3,415,069
HIGH PRESSURE HELIUM PURIFIER
John A. Hauser, Decatur, Ala., assignor to the United
States of America as represented by the Administrator
of the National Aeronautics and Space Administration
Filed Oct. 31, 1966, Ser. No. 591,000
3 Claims. (Cl. 62—40)

ABSTRACT OF THE DISCLOSURE

High pressure helium is purified in parallel identical purification units one of which is in operation while the other is being regenerated. Helium is passed through the inner chamber of a heat exchanger having inner and outer chambers wherein the helium is cooled by purified helium passing through a coil in the inner chamber causing moisture and hydrocarbons to be condensed therefrom. The partially purified helium is then passed through a cold trap and an adsorber section including filters both of which are contained within a body of liquid nitrogen to effect removal of the remainder of the impurities. Purified helium then passes through the coil of the inner chamber while nitrogen, vaporized from the body of nitrogen, passes through the outer chamber of the first heat exchanger.

---

The invention described herein was made by an employee of the United States Government and may be manufactured and used by or for the Government for governmental purposes without the payment of any royalties thereon or therefor.

This invention relates in general to an apparatus and method for purifying helium. More particularly, this invention is a method and apparatus capable of continuously receiving a large quantity of high pressure helium, removing substantially all of the impurities in the helium, and discharging in at substantially the received pressure.

Helium is an inert gas that is found only in the United States and is available from a single source, a federal agency, the Bureau of Mines. Due to its inert properties helium has found many uses in industrial processes and methods, welding for example, where a noncontaminating atmosphere is required. While many of the prior uses of helium have required that the helium be relatively pure, it was only with the advent of the space program that the requirement for large quantities of ultra pure helium became critical.

Helium is a desirable gas to use as a pressurant on board a space vehicle, or as a working medium for onboard power sources. The use of helium is particularly desirable in space vehicles to be used in interplanetary flights and deep space probes because of its inert properties, light weight, and low liquidification temperature. For example, helium is an ideal gas for pressurizing the liquid oxygen and liquid hydrogen tanks in a space vehicle since the helium remains gaseous at the temperature of liquid oxygen and liquid hydrogen. It is imperative, however, that the helium used be ultra pure because any water, hydrocarbons, oxygen, or other gaseous impurities present in the helium will solidify at the temperatures present in a liquid hydrogen tank. The presence of such solid particles in a propellant tank presents an explosion hazard and could clog propellant lines and components.

Ultra clean helium is used in large quantities as a sweeping purge gas for tests of systems and components of space vehicles. The research and development testing of space vehicles extends over long periods and if the helium used in such test operations is not ultra pure there will be a gradual contamination buildup in the vehicle which will eventually cause it to be grossly contaminated.

The propellant tanks of a launch vehicle are heavily insulated to prevent heat transfer thereto and it has been found that the insulative properties of insulation is greatly degraded by the presence of contaminants such as air and/or moisture within the insulation. Thus it has become common practice to purge the insulation around a space vehicle with helium during launch operations. The helium gas used as a purge gas must be ultra pure to eliminate contamination of the insulation. For example, oil or hydrocarbons present in the helium gas is deposited on the interior surfaces of the insulation and when the space vehicle reaches the vacuum conditions of outer space the hydrocarbons and other contaminants left in the insulation are subject to outgassing that degrades the insulation. Further, any oil present in the helium purge gas results in the deposit of an oil film on the interior surface of the insulation to degrade the reflectivity thereof and thus decrease its insulation properties. Cleanliness of insulation becomes particularly important when the insulation is around a storage tank intended for use in storing propellants in orbit around the earth or other space environment. Weight ratios of such storage tankage to the propellant being stored, liquid oxygen, for example, is commonly 6 to 1. In other words, six pounds of tankage and insulation would be normally required to store one pound of liquid oxygen in orbit for an extended period. Extensive efforts are being made to reduce this weight ratio. This is accomplished primarily by insulation improvement and it is readily apparent from the foregoing discussion that the use of ultra pure helium to develop, test, and purge such insulation is required.

An apparatus constructed in accordance with this invention is capable of purifying 900,000 s.c.f. of helium as required by the space program at a rate of 1600 s.c.f.m. (standard cubic feet per minute), and at a working pressure of 5,500 p.s.i.g. Not only can an apparatus constructed in accordance with this invention maintain the flow rates and pressures mentioned, but it can maintain this flow continuously and deliver helium of such high degree of purity that continuous reading instrumentation presently available for use in helium purification and storage systems are not sensitive enough to detect possible residual impurities. The purification of quantities greater than the "batch capacity of 900,000 s.c.f." of gaseous helium for a sustained period is made possible by the apparatus having dual purification circuits that are identical and connected in parallel so that one of the circuits can be regenerated and held on standby while the other circuit is in operation. When the circuit in use has processed its designed capacity of helium the standby circuit is placed in operation and the contaminated circuit is regenerated and placed on standby.

Helium supplied from storage tanks or other sources is connected through the input of the purification apparatus. This input flow of helium is routed by suitable valve means to the purification circuit in operation. The helium is first routed through an insulated heat exchanger having a cooling coil mounted therein where moisture, carbon dioxide, vapors and other hydrocarbon impurities in the helium flowing across the coil are condensed out in the form of frost or rime. Downstream from the heat exchanger unit is a vacuum insulated container, a Dewar, that is filled with liquid nitrogen. Helium from the heat exchanger unit is piped into a cold trap immersed in the liquid nitrogen where any solidified impurities remaining in the helium flow are removed. After flowing through the cold trap the helium is routed to an activated charcoal bed also immersed in the liquid nitrogen where the remaining impurities are removed from the helium with the possible exception of small traces of hydrogen, neon or nitrogen. The flow of the now ultra pure helium from the activated charcoal bed is directed back to the heat exchanger cooling coil. The helium coming from the charcoal is of course very cold and when flowing through the heat exchanger the temperature within the cooling coil is dropped to a sufficiently low level that most impurities such as moisture, carbon dioxide, and oil vapors contained in the helium passing through the heat exchanger unit are frozen out. The walls of the heat exchanger unit define a chamber through which boil off from the Dewar is circulated to improve the efficiency of the system. Purified helium flowing from the cooling coil is directed through a final filter to an outlet valve where it is distributed as desired. The system also has equipment incorporated therein which permits heating of the various components of the system and cleaning thereof by means of a vacuum and nitrogen purge to regenerate a purification circuit that has become contaminated during operation.

It is therefore an object of this invention to provide a new and novel helium purifying apparatus capable of continuously processing larger quantities of helium than apparatus available heretofore.

Another object of this invention is to provide a helium purifying apparatus having two purification circuits connected in parallel so that one circuit can be in continuous operation while the other circuit is being regenerated or on standby.

These and other objects and attendant advantages of the present invention will become more apparent when considering the following detailed description in conjunction with the attached drawing wherein:

The figure of the drawing is a flow diagram of the invention that illustrates the various components of the invention schematically.

Referring now to the drawing, it will be seen that the apparatus includes two identical low temperature purification sections indicated generally by 10 and 12. High pressure helium from storage or some other available source is supplied to input connection 14 of pipe or line 16 at 5,000 p.s.i.g. Line 16 routes helium to purification section 12 and a pipe or line 18 connected into line 16 near input 14 routes helium to purification section 10.

The invention will be described in detail by discussing the operation thereof. In this discussion it will be assumed that purification section 12 is in operation with section 10 on standby. In this situation valve 20 in line 18 is closed and valve 22 in line 16 is opened allowing helium to flow into a heat exchanger unit 24. The heat exchanger unit has a casing composed of inner wall 26 and outer wall 28 that defines a chamber 30 through which cold nitrogen gas is circulated. The heat exchanger unit has a cooling coil 32 mounted therein through which cold helium gas, from a source discussed hereafter, is circulated. The cooling capacity of the heat exchanger unit is such that the entering flow of helium is cooled to —300° F., at which temperature, water vapor, carbon dioxide, hydrocarbon vapors and other impurities condense out in the form of frost or rime on the cooling coil. The chilled helium then passes from the heat exchanger unit through pipe or line 34 to a cold trap 36 mounted in a vacuum insulated Dewar 38. During operation, the Dewar is maintained substantially filled with liquid nitrogen and cold trap 36 is located so as to be immersed in the liquid nitrogen. The function of the cold trap is to remove any frozen impurities remaining in the helium flow from heat exchanger 24. Helium leaving the cold trap is routed through a coil 40, also immersed in liquid nitrogen, which further lowers the temperature of the helium. The helium then enters an absorber section 42 immersed in the liquid nitrogen that includes an input filter 44, an activated charcoal bed 46 of 150 to 175 lbs. of activated coconut shell charcoal, and an output filter 48. All impurities remaining in the helium with the exception of possible small traces of hydrogen, neon, and nitrogen are removed by the activated charcoal. The helium flowing from the Dewar is sufficiently pure that available instrumentation for continuously monitoring the purity of flowing helium is not sensitive enough to detect any impurities in the helium. In order to assure or determine the purity of the helium being delivered by this invention, it will be necessary to tap off samples and make a laboratory analysis thereof.

Liquid nitrogen is supplied to Dewar 38 from source 50 via line 52 through flow control valve 54 and into the Dewar. Flow control valve 54 is controlled by a suitable fluid level control device 56 which senses the level of liquid nitrogen in Dewar 38 and actuates flow control valve 54 in response to variations in the fluid level. The level of liquid nitrogen would be continuously reduced during operation due to boil off and thus must be replenished from source 50. The nitrogen boil off is routed from Dewar 38 to chamber 30 in heat exchanger 24, via line 58, to aid in lowering the temperature of the helium flowing through the heat exchanger. Chamber 30 is vented to the atmosphere via safety relief valve 60.

Helium leaving absorber 42 is routed to one end of cooling coil 32 in heat exchanger 24 via line 62. The helium is very cold after having flowed through the absorber and it cools coil 32 as it flows therethrough to result in the temperature of the helium entering the heat exchanger being lowered to approximately —300° F. The helium flowing from the coil is warmed by the heat exchanger to near ambient temperature and passed through pipe 64 to a 2 micron (absolute) filter 66 and then to outlet 68 of the apparatus for distribution.

The purification section just described is capable of purifying at least 900,000 s.c.f. before regeneration of the section is required. Regeneration is accomplished by first placing purification section 10 on stream and removing section 12 from operation. This is accomplished by opening valve 20 in line 18 to admit helium to section 10 and closing valve 22 in line 16 to stop the flow to section 12. It is of course necessary to open and close other valves in the systems as discussed more fully hereafter.

Assuming section 10 has been placed in operation, section 12 as valved off to be regenerated in the following manner. The flow of liquid nitrogen to Dewar 38 is stopped by closing nitrogen flow control valve 54. All vent and drain valves in heat exchanger 24, cold trap 36, and Dewar 38 are opened for nitrogen removal and drainage of impurities from these components. Heating elements 82 and 84 positioned adjacent the heat exchanger and absorber are energized at this time and the temperature of the heat exchanger and absorber are raised to 225° F. The majority of impurities that have been trapped are vaporized and removed when the apparatus is subjected to a hot nitrogen reverse flow purge as discussed hereafter.

Gaseous nitrogen from a source 70 is directed to a preheater 72 where its temperature is raised to 225° F. The hot nitrogen gas is then circulated via line 64 to cooling coil 32, through line 62 to absorber 42, to the cold trap 36 and then back to the interior of heat exchanger 24. The hot nitrogen then passes to the atmosphere via line 16 and vent valve 74 connected into line 16. The passage of hot gas through the system sweeps out or purges impurities collected in the system. During the period when the system is being purged with hot nitrogen gas, heat exchangers 24 and absorber 42 are heated by the heaters. These heaters are each connected to a 440 volt, 3 phase, 60 cycle power source (not shown).

When the nitrogen purge has been completed, the section being regenerated is isolated from the source of gaseous nitrogen by closing valve 86 and all drain and vent valves in the section are closed. The section is then connected to a vacuum pump 87 by opening valves 88 and 90. Valve 65 would be closed of course as would valves 92 and 94 which connect purifier section 10 into the vacuum pump. A vacuum is then pulled in the heat exchanger, cold trap, and charcoal bed to remove the last traces of condensed and absorbed impurities. The regeneration of the contaminated section is substantially accomplished by the heating and nitrogen purge process. However, in order to regenerate the system to the highest purity level, a vacuum is pulled on the system which vaporizes and removes all possible remaining contaminants present.

This completes the detailed description of the invention. The operation and regeneration of purification section 10 has not been described in detail herein since it is identical to purification section 12. Also it should be understood that the valving included in the drawing has been kept to minimum for purposes of simplification and clarity of illustration. The actual operating embodiment of this invention includes a number of pressure gauges, relief valves, drain and vent valves and special groupings of valves to avoid large pressure differentials between the upstream and downstream side of a single valve. Inasmuch as providing adequate valving to satisfy good engineering and safety requirements requires only the application of engineering techniques and standards, the illustration and description is deemed adequate.

Further, while a preferred exemplary embodiment of the invention has been described herein, there will be many changes and modifications which can be made to the invention by those skilled in the art to which the invention pertains without departing from the spirit and scope of the invention as defined in the claims appended hereto.

What is claimed is:

1. A helium purification apparatus for continuously purifying large quantities of high pressure helium having two identical purification units connected in parallel so that one of the units can be regenerated and on standby while the other of the units is in operation, said apparatus comprising:

inlet means for selectively admitting high pressure helium to either of the purification units;
   each of said purification units including:
      a heat exchanger having inner and outer walls forming inner and outer chambers, said heat exchanger being connected to said inlet means for receiving a flow of helium therefrom which is flowed through the inner chamber of said heat exchanger, said heat exchanger having a cooling coil mounted in the inner chamber thereof for lowering the temperature of helium flowing therearound to a point where moisture and hydrocarbon impurities contained therein will be condensed on said coil;
      an insulated container having means connected thereto for maintaining said insulated container substantially filled with liquid nitrogen, said insulated container being connected by conduit to the outer chamber of the heat exchanger so as to permit boil off from the liquid nitrogen to pass to the outer chamber of the heat exchanger and thereby enhance the efficiency thereof;
      a cold trap mounted in said insulated container and immersed in the liquid nitrogen, said cold trap being connected to said heat exchanger to receive a flow of gaseous helium therefrom and remove any solidified impurities remaining in the helium flow;
      a filter means mounted in said insulated container and immersed in the liquid nitrogen, said filter means being connected to said cold trap so as to receive the flow of helium therefrom and remove any gaseous impurities present therein; and
      said filter means being in communication with one end of said cooling coil mounted in said heat exchanger for flowing cold helium through said cooling coil;
   outlet means connected to and adapted to be selectively placed in communication with either of the purification units to receive and distribute the flow of purified helium from the cooling coil in the heat exchanger of the purification unit in operation;
   regenerating means for cleaning each of the purification units while the other is in operation so as to permit continuous operation of the system;
   said regenerating means including a heater in each heat exchanger and a heater mounted around the filter means in each insulated container for heating the heat exchangers and filter means during regeneration thereof; and
   means for subjecting each of the purification units to a hot nitrogen purge during regeneration thereof.

2. The helium purification system recited in claim 1 which further includes vacuum pump means for evacuating the purification section being regenerated so as to further clean the purification section subsequent to the nitrogen purge thereof.

3. A system for purifying helium comprising:
   a pair of identical low temperature purification sections connected in parallel whereby one of said purification sections can be maintained in a standby condition while the other is in operation;
   said system including a common inlet means connected to both of said purification sections for receiving a flow of helium to be purified and selectively routing the helium flow to the purification section in operation;
   each of said purification sections including:
      a double walled heat exchanger having inner and outer chambers and a cooling coil disposed in said inner chamber, said inner chamber being connected to said common inlet means for receiving helium flow therefrom and said cooling coil being adapted to be cooled to a temperature wherein impurities present in the helium flowing around said cooling coil will be solidified and condensed out on said cooling coil;
      a cold trap connected to said inner chamber of said heat exchanger to receive the helium flow therefrom and remove any remaining solidified impurities therein;
      a filter means connected to said cold trap that receives the flow of helium therefrom and removes substantially all gaseous impurities in the helium flow;
      said cold trap and said filter means being mounted in a vacuum insulated container having means connected thereto for keeping said container substantially filled with liquid nitrogen when the purification section is in operation;
      said cooling coil being connected to said filter means to receive the flow of helium therefrom; and
      said outer chamber of said heat exchanger being connected to said insulated container so that boiloff from the liquid nitrogen contained in said insulated container will pass into the outer chamber of said heat exchanger and thereby increase the efficiency thereof;
   said system including a common outlet means that is connected to the cooling coil in each heat exchanger for selectively receiving the flow of purified helium from either of said purification sections; and
   regenerating means for cleaning the purification sections after a cycle of operation that includes:
      purging means for heating each of the heat exchangers and filter means and for flowing a hot nitrogen purging gas through the purification unit being regenerated; and
      means for evacuating the purification unit being regenerated for a period of time after the nitrogen purge thereof so as to further clean the purification section.

(References on following page)

References Cited

UNITED STATES PATENTS

| | | | |
|---|---|---|---|
| 2,113,680 | 4/1938 | De Baufre | 62—13 |
| 2,252,739 | 8/1941 | Stoever | 62—12 |
| 2,895,303 | 7/1959 | Streeter | 62—12 |
| 3,011,589 | 12/1961 | Meyer. | |
| 3,057,167 | 10/1962 | Yendall et al. | |
| 3,063,247 | 11/1962 | Yendall | 62—13 |
| 3,091,093 | 5/1963 | Becker | 62—13 |
| 3,126,264 | 3/1964 | Damsz | 62—18 XR |
| 3,126,266 | 3/1964 | Meisler | 62—18 |
| 3,150,942 | 9/1964 | Vasan | 55—75 XR |
| 3,355,860 | 12/1967 | Arnoldi | 55—75 XR |

FOREIGN PATENTS

| | | |
|---|---|---|
| 1,364,165 | 5/1964 | France. |
| 1,365,881 | 5/1964 | France. |

NORMAN YUDKOFF, *Primary Examiner.*

V. W. PRETKA, *Assistant Examiner.*

U.S. Cl. X.R.

62—14, 18; 55—66, 74